May 25, 1937.   T. N. HUDSPETH   2,081,301
ELEVATOR
Filed March 18, 1935
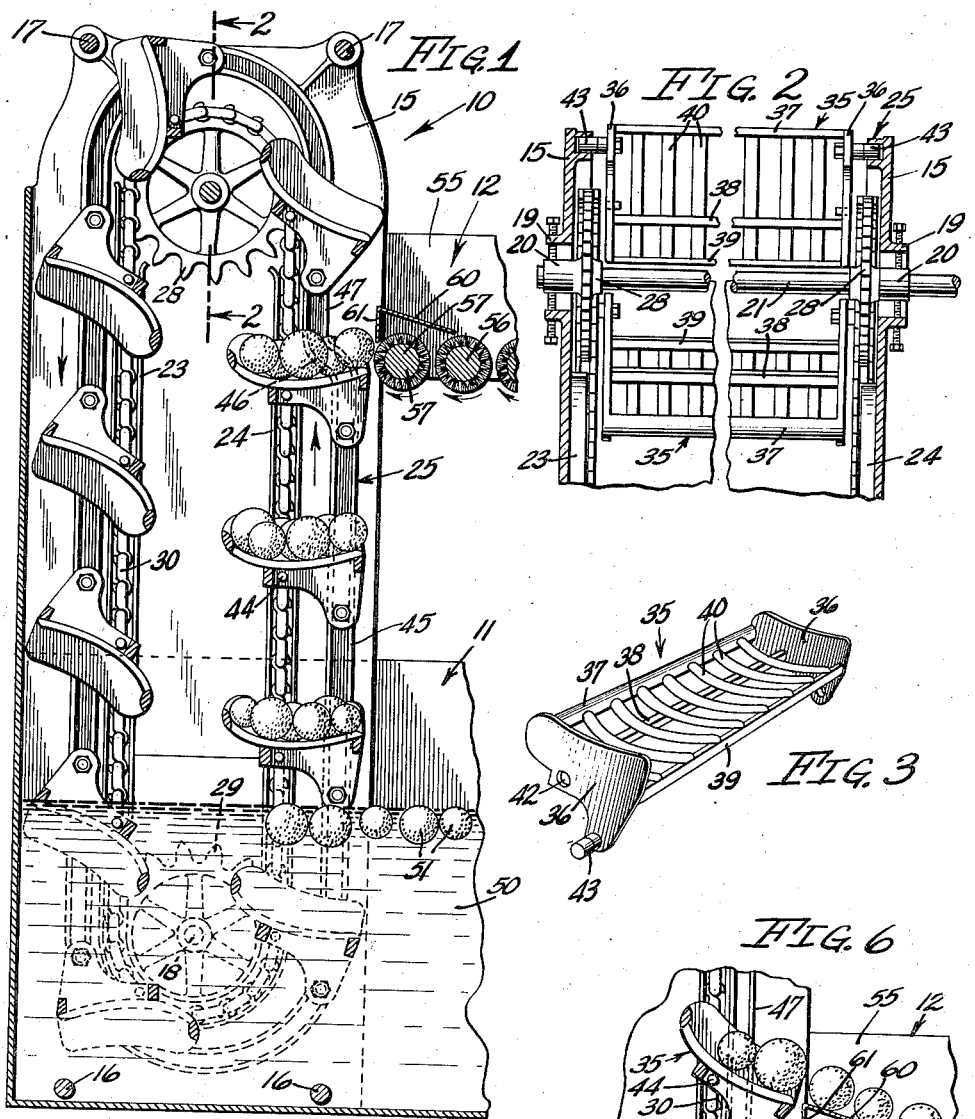
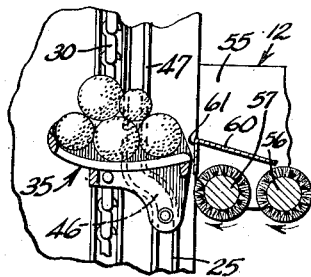
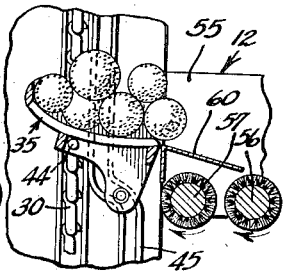
INVENTOR
THOMAS N. HUDSPETH
BY
ATTORNEY Patented May 25, 1937

2,081,301

UNITED STATES PATENT OFFICE 2,081,301

ELEVATOR

Thomas N. Hudspeth, Santa Ana, Calif., assignor, by mesne assignments, to Food Machinery Corporation, a corporation of Delaware Application March 18, 1935, Serial No. 11,577

6 Claims. (Cl. 198—155)

This invention relates to elevators for loose, whole, rollable articles and is especially useful in the fresh fruit industry in commercially handling loose oranges, lemons, apples, and the like.

Among the objects sought after is an elevator which will handle fresh whole fruit very gently; an elevator the working parts of which are subjected to a relatively small amount of wear and tear thereby insuring long life and low power consumption; an elevator which is quiet in operation; an elevator which is low in first cost; and an elevator which can deliver fresh fruit gently onto a transverse fruit brushing machine.

The manner of accomplishing the foregoing objects as well as numerous other objects and advantages may be seen in the following description, taken in connection with the accompanying drawing, in which:

Fig. 1 is a longitudinal vertical sectional view of a preferred embodiment of the invention.

Fig. 2 is a fragmentary transverse sectional view taken on the line 2—2 of Fig. 1.

Fig. 3 is a perspective view of one of the fruit trays of the invention.

Fig. 4 is a diagrammatic fragmentary operation view showing a fruit tray just before it arrives at discharge position.

Fig. 5 illustrates the fruit tray just after it has arrived at discharge position.

Fig. 6 is an operation view similar to Figs. 4 and 5 and illustrating a fruit tray in its final position at the point of discharge.

The preferred embodiment of this invention illustrated in the drawing comprises a fresh fruit elevator 10 associated with a fruit soaking tank 11 and adapted to elevate fruit therefrom and discharge it onto a fruit brusher 12.

The elevator 10 includes a pair of side frame plates 15 which are mounted in one end of the tank 11 held in rigidly spaced relation by tie rods 16 and 17. At the lower ends the plates 15 are formed to provide support for stub-shafts 18 and at the upper ends these plates have vertically adjustable mountings 19 for bearings 20 in which is journalled a drive shaft 21. Also provided on the plates 15 are inwardly disposed double-walled chain guides 23 and 24 and a double walled tray roller guide 25 the exact conformation of which will be pointed out hereinafter.

Fixed on the shaft 21 is a pair of sprockets 28 and rotatably mounted on the stub shafts 18 are sprockets 29. Trained about the sprockets 28 and 29 are endless chains 30. Disposed between the chains 30, are elevator trays 35, having end pieces 36 connected by bars 37, 38 and 39, bar 37 forming a back stop at the inner edge of the tray and the bar 39 being disposed along the discharge edge of the tray. Connecting these bars and overlying the top of bar 39 are curved ribs 40 forming the bottom of the tray 35. The end pieces 36 of each tray 35 are provided with holes 42 and guide rollers 43. Chains 30 are provided with suitable pins 44 which extend through the holes 42 and pivotally support the trays 35 between the chains 30. The guide rollers 43 extend between the walls of the guide 25. Each guide 25 is preferably shaped as shown in Fig. 1, and has a section 45 which is parallel with and disposed outwardly from the rising flights of the chains 30 which pass through the chain guides 24. The upper end of each section 45 joins with an inwardly inclined section 46, the latter terminating in a section 47 which extends upwardly parallel with the rising flight of the chain 30 but considerably closer to that flight than the section 45.

It is to be noted that the rollers 43 are disposed a considerable distance outwardly from the pivot holes 42 and downwardly therefrom when the trays 35 are in upright fruit carrying position.

In Fig. 1 the tank 11 is shown fragmentarily as containing the body of water 50 on the surface of which floats a quantity of fruit 51. Floating into the path of trays 35 this fruit is lifted from the water by the rising trays.

The fruit brusher 12 includes side members 55 and a plurality of parallel rotary cylindrical brushes 56 which are disposed transversely of the brusher. The endmost brush 57 of these brushes 56 lies parallel with and preferably in contact with the discharge edge of each tray 35 when this arrives at the same level as brush 57. Means are provided for continuously rotating the brushes 56 in the direction of the arrows placed thereon in the drawing.

Mounted between the frame members 55 of the brusher 12 is a drop board 60 having a vertical wall 61 extending downwardly from its inner edge as shown in the drawing.

Operation

In the operation of any device for handling loose fresh fruit such as oranges, apples, grapefruit, lemons, or the like, it is a matter of transcendent importance that the fruit be gently handled. This means that it is highly desirable that all blows against the fruit such as caused by impact of a moving element of the machine with the fruit or by dropping the fruit be eliminated. It is for this reason that the delivery of fruit by the elevator 10 to the drop board 60 is one of the most significant features of this invention. When the trays 35 pick up the fruit from the water, pieces of this fruit are likely to extend outwardly over the discharge edge of the tray 35, as illustrated in Fig. 1 in the two trays which have just lifted fruit out of the water 50. In this figure the third tray above the water, however, is just coming opposite the rotating brush 57 which brush engages the fruit protruding from the tray and pushes this back over onto the tray as illustrated. This brings the protruding fruit inwardly from under the drop board 60 and prevents damage of the fruit by crushing against the drop board. As the tray 35 continues upward as shown in Fig. 4 the outer or discharge edge of the tray approaches the level of the inner edge of the drop board 60, and at the same time the guide rollers 43 on this tray 35 enter the lower end of the roller guide section 46 of the guide 25.

Fig. 5 illustrates how the action of the guide section 46 on the rollers 43 halts the upward movement of the discharge edge of the tray 35 opposite the inner or receiving edge of the drop board 60 while the balance of the tray 35 continues to travel upwardly with the pins 44 on the chains 30. This gently tilts the tray 35 until the upper surface of this is practically in alignment with the upper surface of the drop board 60 as shown in Fig. 6, thus giving the fruit opportunity to roll gently by gravity from the tray 35 onto the drop board as shown in this figure. The fruit runs across the drop board 60 and onto the rotating brushes 56 where it is washed, dried, and polished in successive operations.

After reaching the rocked position shown in Fig. 6 each tray 35 moves bodily upward with the chains 30 by virtue of the guide section 47 guiding the rollers 43 parallel with the rising flights of the chains 30.

It is thus seen that I have produced an elevator which is extremely gentle in its handling of loose whole fresh fruit. It is also clear that the avoiding of changes in direction of the chains 30 for dumping the fruit from the trays eliminates considerable expensive construction and greatly reduces the wear on the chain.

What I claim is:

1. In combination: a drive shaft adapted to rotate in a given direction; a pair of spaced driving sprockets fixed on said shaft; a pair of aligned idle sprockets spaced below, and in parallel alignment with said drive sprockets; endless chains equal in length and trained about said aligned pairs of sprockets, the rising flights of said chains being allowed to follow a relatively straight path; guides for said rising flights; shallow concave trays disposed between said chains and pivotally attached to opposite points on said chains; means for maintaining said trays in upright position as they are lifted on said rising flights and tilting said trays on said pivotal axes at a point for discharging the burden therefrom; a rotary member disposed parallel with and adjacent the upward path taken by said trays just below said point of discharge, said rotary member being adapted to engage fruit extending over the adjacent edge of each tray passing thereby and shifting said fruit backwardly into said tray; and a drop board disposed parallel with said rotary member and having an edge disposed at said point of discharge and closely adjacent to each of said trays when it is at said point of discharge.

2. A combination as in claim 1 in which said drop board has an apron extending downwardly from the inner edge thereof close to said rotary member.

3. In an elevator for handling fresh, whole, loose fruit, the combination of: a pair of plates; means for rigidly spacing said plates on opposite sides of a vertical path along which it is desired to elevate fruit; aligned bearings supported on upper portions of said plates; a drive shaft journalled in said bearings; a pair of drive sprockets fixed on said shaft and disposed immediately within said plates; idle shaft means mounted on lower portions of said plates and disposed inwardly therefrom parallel with said drive shaft; idle sprockets mounted on said idle shaft means in parallel alignment with said drive sprockets; a pair of endless chains trained about said sprockets and lying relatively close to the inner faces of said plates; walls provided on and extending inwardly from the inner faces of said plates to form vertical guide ways loosely receiving and guiding those portions of said chains lying between said drive sprockets and said idle sprockets; other walls provided on and extending inwardly from the inner faces of said plates to form continuous double-walled roller guide ways extending entirely around and outside of the path followed by said chains; shallow concave trays having fruit supporting surfaces over which the fruit is adapted to freely roll laterally when said trays are tilted laterally, said trays being pivotally supported at their opposite ends upon said chains; guide rollers extending laterally from said trays into said roller guide ways on axes spaced substantial distances both horizontally and vertically from the aforesaid pivotal mounting of said trays on said chains; and a downwardly inclined ramp for receiving fresh, whole, loose fruit successively from said trays when each of these reaches a given elevation, said roller guide way maintaining each of said trays in a substantially level position during the upward travel thereof until said tray is opposite said ramp and then rocking said tray to cause the fruit to roll directly from said tray onto said ramp, with substantially no bumping of the fruit.

4. A combination as in claim 3 in which the aforesaid roller guide way on each side of the elevator is disposed substantially in the same plane with the aforesaid sprockets and chain guide ways on said side.

5. In an elevator for handling fresh, whole, loose fruit the combination of: a pair of plates; means for rigidly spacing said plates on opposite sides of a vertical path along which it is desired to elevate fruit; chain channel forming walls provided on inner faces of said plates; roller channel forming walls provided on inner faces of said plates, said walls on each of said plates being reverse duplicates of and disposed opposite those of the other of said plates; aligned bearings supported on upper portions of said plates; a drive shaft journalled in said bearings; a pair of drive sprockets fixed on said shaft and disposed immediately within said plates; idle shaft means mounted on lower portions of said plates and extending inwardly therefrom parallel with said drive shaft; idle sprockets mounted on said idle shaft means in parallel alignment with said drive sprockets; a pair of endless chains trained about said drive and idle sprockets, portions of said chains between said sprockets lying in said chain channels; shallow trays pivotally supported at their opposite ends upon said chains;

guide rollers extending laterally from said trays into said roller channels, said roller channels lying in substantially the same planes as said chain channels; and a ramp for receiving loose whole fruit successively from said trays when each of the latter reaches a given elevation, said roller channels guiding said rollers to maintain each of said trays in a substantially level position during the upward travel thereof until said tray is opposite said ramp and then rocking said tray to cause the fruit to roll directly from said tray onto said ramp with substantially no bumping of the fruit.

6. In an elevator for handling fresh, whole, loose fruit the combination of: a pair of rigidly spaced frames disposed on opposite sides of a vertical path along which it is desired to elevate fruit; chain guide walls mounted on said frames to extend inwardly therefrom towards said path; roller guide walls provided on said frames and extending inwardly therefrom towards said path, said walls on each of said frames being reverse duplicates of and disposed opposite those on the other of said frames; aligned bearings supported on upper portions of said frames; a drive shaft journalled in said bearings; a pair of drive sprockets fixed on said shaft on opposite sides of said path; idle shaft means mounted on lower portions of said frames and extending inwardly therefrom parallel with said drive shaft; idle sprockets mounted on said idle shaft means in parallel alignment with said drive sprockets, said guide walls and said sprockets on each side of said path lying substantially in the same vertical plane; a pair of endless chains trained about said drive and idle sprockets, portions of said chains between said sprockets lying in guided relation with said chain guide walls; shallow trays pivotally supported at their opposite ends upon said chains; guide rollers extending laterally from said trays into guided relation with said roller guide walls; and a ramp for receiving loose whole fruit successively from said trays when each of the latter reaches a given elevation, said chain guide walls guiding said chains and said roller guide walls guiding said rollers to maintain each of said trays in a substantially level position during the upward travel thereof until said tray is opposite said ramp and then rocking said tray to cause the fruit to roll directly from said tray onto said ramp with substantially no bumping of the fruit.

THOMAS N. HUDSPETH.